US012780417B2

(12) United States Patent
Rodriguez

(10) Patent No.: US 12,780,417 B2
(45) Date of Patent: Nov. 3, 2026

(54) FRAME FOR AN AIRCRAFT SEAT CONSISTING OF PLANAR CUT AND ASSEMBLED PARTS AND MANUFACTURING METHOD THEREOF

(71) Applicant: AIRBUS ATLANTIC, Rochefort (FR)

(72) Inventor: Frédéric Rodriguez, Rochefort (FR)

(73) Assignee: AIRBUS ATLANTIC, Rochefort (FR)

( * ) Notice: Subject to any disclaimer, the term of this patent is extended or adjusted under 35 U.S.C. 154(b) by 219 days.

(21) Appl. No.: 18/005,652

(22) PCT Filed: Jul. 16, 2021

(86) PCT No.: PCT/EP2021/070034
§ 371 (c)(1),
(2) Date: Jan. 16, 2023

(87) PCT Pub. No.: WO2022/013445
PCT Pub. Date: Jan. 20, 2022

(65) Prior Publication Data

US 2023/0339612 A1 Oct. 26, 2023

(30) Foreign Application Priority Data

Jul. 17, 2020 (FR) ....................................... 2007492

(51) Int. Cl.
*B64D 11/06* (2006.01)
*A47C 3/12* (2006.01)
(Continued)

(52) U.S. Cl.
CPC ............ *B64D 11/0606* (2014.12); *A47C 3/12* (2013.01); *A47C 5/046* (2013.01); *A47C 5/12* (2013.01);
(Continued)

(58) Field of Classification Search
CPC ............ B64D 11/0619; B64D 11/0649; B64D 11/0602; B64D 11/0606; B60N 2/68;
(Continued)

(56) References Cited

U.S. PATENT DOCUMENTS 1,740,219 A * 12/1929 Berson .................... E04C 2/423 52/668
2,118,456 A * 5/1938 Le Grand ................ B60N 2/68 297/378.1
(Continued)

FOREIGN PATENT DOCUMENTS

FR 1244800 9/1960
JP 2018052490 A * 4/2018 ....... B64D 11/00153
(Continued)

OTHER PUBLICATIONS 7 page PDF of an English translation of the Written Opinion mailed Aug. 9, 2021 in parent application PCT/EP2021/070034. (Year: 2021).*

(Continued)

*Primary Examiner* — Robert Canfield
(74) *Attorney, Agent, or Firm* — Perman & Green, LLP

(57) ABSTRACT

Frame for a primary structure of an aircraft seat, comprising longitudinal parts and transverse parts spaced apart from, and connected to, one another, the parts having various shapes and dimensions so as to reproduce a general three-dimensional shape of the primary structure, the longitudinal and transverse parts being planar and each comprising at least one joint, the parts being joined together by their joints.

11 Claims, 4 Drawing Sheets

(51) Int. Cl.
*A47C 5/04* (2006.01)
*A47C 5/12* (2006.01)
*E04C 2/42* (2006.01)

(52) U.S. Cl.
CPC ...... *B64D 11/0619* (2014.12); *B64D 11/0649* (2014.12); *E04C 2/423* (2013.01)

(58) Field of Classification Search
CPC ........... B60N 2/682; A47C 3/12; A47C 5/046; A47C 5/12; E04C 2/423; E04B 1/19; E04B 1/2403
USPC ............................. 52/653.1, 655.1, 664–668
See application file for complete search history.

(56) References Cited

U.S. PATENT DOCUMENTS

| | | | | | |
|---|---|---|---|---|---|
| 2,366,677 | A * | 1/1945 | Rosenthal | A47B 47/042 | 108/180 |
| 2,649,147 | A * | 8/1953 | Sanford | A47C 7/024 | 297/411.42 |
| 2,680,501 | A * | 6/1954 | Cunningham | F21V 11/06 | 428/116 |
| 2,763,318 | A * | 9/1956 | Bertoia | A47C 3/12 | 297/448.2 |
| 2,918,995 | A * | 12/1959 | Kruger | E04C 2/423 | 403/375 |
| RE24,964 | E * | 4/1961 | Eams | A47C 3/12 | 297/452.64 |
| 3,768,864 | A * | 10/1973 | Niewulis | A47C 7/20 | 297/445.1 |
| 3,807,116 | A * | 4/1974 | Flynn | E04C 2/36 | 428/116 |
| 3,927,950 | A * | 12/1975 | Herrmann | F16B 7/00 | 29/525 |
| 4,439,958 | A * | 4/1984 | Lew | E04C 2/422 | 52/667 |
| 5,018,332 | A * | 5/1991 | Ying-Kit | E04B 9/345 | 52/666 |
| 5,069,009 | A * | 12/1991 | Suzuki | E04B 1/35 | 52/81.3 |
| 5,284,380 | A * | 2/1994 | Gehry | B27D 1/08 | 297/451.9 |
| 5,447,360 | A * | 9/1995 | Hewko | B60N 2/4249 | 297/216.13 |
| 5,657,605 | A * | 8/1997 | Sidney | F16B 7/22 | 403/201 |
| 5,695,253 | A * | 12/1997 | Jenkins | A47C 5/04 | 297/344.21 |
| 6,132,129 | A * | 10/2000 | Frazier | A47B 13/04 | 403/219 |
| 7,114,300 | B1 * | 10/2006 | Culp | A47B 47/042 | 211/186 |
| 7,856,772 | B1 * | 12/2010 | Culp | A47B 47/047 | 211/186 |
| 8,087,612 | B2 | 1/2012 | Park | | |
| 8,256,845 | B2 * | 9/2012 | Wang | A47C 5/02 | 297/451.3 |
| 8,404,329 | B2 * | 3/2013 | Wustefeld | E04C 2/36 | 52/668 |
| 8,733,058 | B2 * | 5/2014 | Ulgen | B63B 29/02 | 114/189 |
| 10,070,727 | B2 * | 9/2018 | Burwell | A47C 7/46 | |
| 2004/0212243 | A1 * | 10/2004 | Johnson | B64D 11/0648 | 297/452.18 |
| 2005/0145597 | A1 | 7/2005 | Kull et al. | | |
| 2010/0196657 | A1 * | 8/2010 | Wustefeld | E04C 2/423 | 428/119 |
| 2012/0085863 | A1 | 4/2012 | Kladde | | |
| 2012/0131878 | A1 * | 5/2012 | Ivanov | A63H 33/084 | 52/655.1 |
| 2018/0222590 | A1 | 8/2018 | Natsume et al. | | |
| 2021/0094690 | A1 * | 4/2021 | Darbyshire | B60N 2/345 | |
| 2022/0118894 | A1 * | 4/2022 | Guo | B60N 2/682 | |

FOREIGN PATENT DOCUMENTS

| | | |
|---|---|---|
| WO | 9206003 | 4/1992 |
| WO | 2006006930 | 1/2006 |

OTHER PUBLICATIONS

International Search Report for application No. PCT/EP2021/070034 dated Aug. 9, 2021.

* cited by examiner

FRAME FOR AN AIRCRAFT SEAT CONSISTING OF PLANAR CUT AND ASSEMBLED PARTS AND MANUFACTURING METHOD THEREOF

CROSS REFERENCE TO RELATED APPLICATIONS

This application is a National Stage of International Application No. PCT/EP2021/070034, having an International Filing Date of 16 Jul. 2021, which designated the United States of America, and which claims priority from and the benefit of French Patent Application No. 2007492 filed on 17 Jul. 2020, the disclosures of which are incorporated herein by reference in their entireties.

BACKGROUND

Field

The present disclosure belongs to the field of aeronautical structures and analogs, in particular primary structures for on-board equipment and supplies, and relates more particularly to a frame for an aircraft seat shell obtained by assembling planar cut structural parts, as well as an associated manufacturing method.

Brief Description of Related Developments

In an aircraft such as an airplane, every on-board piece of equipment is sized and qualified to meet requirements that are functional, safety-related and economical at the same time. For example, for a passenger seat, this results in a trade-off essentially between the mechanical strength and the mass of the primary structure of the seat. Other criteria such as fire resistance are also taken into account.

In the field of civil aviation more particularly, there are standards and regulations establishing a whole series of criteria that passenger seat structures must meet for certification thereof. For example, the primary structures such as the shells of the passenger seats must have a given mechanical resistance to the different stresses in service, in particular impacts and vibrations, as well as flame-retardant and fire-resistance properties.

In addition, the weight constraint, which is essential for airlines because it directly affects the operating cost of the aircraft.

As a general rule, most on-board structures (seats, cabinets, etc.) currently consist of composite panels assembled by metal connecting parts. For example, these panels have a honeycomb sandwich structure, abbreviated as Nida, which enhances their mechanical resistance and guarantees maximum lightweight.

Nida composite panels are complex to manufacture, expensive and have a long manufacturing cycle. Hence, their use systematically requires starting the operations of defining the seat and fitting out the aircraft cabin very early in the action plan of the considered program.

There are many designs for aircraft seats. For example, the document US2012085863A1 discloses a seat with a complex design wherein the structure consists of different elements (plates, beams and multiform fastening and joining means). Other designs are characterized by a predominance of plate elements and are more suited for energy absorption in the event of impact, document US2005145597A1 gives an example thereof.

In these solutions, the use of plate-type structural elements strongly limits the variety of possible shapes. Therefore, making of free-form shell structures quickly becomes very complex and subject to the vagaries of the use of Nida panels for this kind of items, namely the duration and the cost of manufacture.

Nevertheless, the need of airlines offering higher classes, such as business class or first class, in terms of aesthetic shapes, especially for space dividers, remains paramount.

To date, there is no viable alternative to Nida panels for the targeted applications.

SUMMARY

The present disclosure aims to overcome the drawbacks of the prior art set out hereinabove, in particular to provide an alternative solution for making aircraft seat primary structures, with more or less complex three-dimensional shapes, by assembling planar cut parts with relatively simple shapes.

The disclosure also aims to provide an alternative to honeycomb composite panels, widely used in the aeronautical industry, whose costs are high and whose manufacturing cycles are long.

To this end, an object of the present disclosure is a frame for an aircraft seat primary structure, comprising longitudinal parts and transverse parts spaced apart and assembled together, said parts having varied shapes and dimensions so as to replicate a general three-dimensional x shape of the primary structure. This structure is remarkable in that the longitudinal and transverse parts are planar and in that each of them includes at least one joint, the said parts being assembled by their joints.

According to a particularly advantageous aspect of the disclosure, each longitudinal part is provided with a plurality of joints distributed along an edge of said part, each of said joints cooperating with a joint of a transverse part. Similarly, each transverse part is provided with a plurality of joints distributed along an edge of said part, each of said joints cooperating with a joint of a longitudinal part.

According to one embodiment, the mean planes of the transverse parts are substantially parallel and the mean planes of the longitudinal parts are substantially perpendicular to the mean planes of said transverse parts. Thus, the longitudinal and transverse parts can be assimilated respectively to stringers and bulkheads, the stringers being connected by parallel bulkheads to form the frame.

According to an advantageous embodiment, each joint has a depth substantially equal to half a local width of the part including said joint.

More particularly each assembly between a longitudinal part and a transverse part is of the T-shaped half-timber type.

Advantageously, the longitudinal and transverse parts are plate elements, i.e. they have one dimension, the thickness, which is negligible compared to the other two, namely the length and the width.

According to the disclosure, the frame may also include auxiliary planar parts of any shape as well as planar hooking and fastening parts.

For example, the auxiliary parts and the hooking and fastening parts may be fastened to the rest of the frame by means such as tenons and mortises.

According to one embodiment, the longitudinal and transverse parts are metallic. More generally, all of the planar parts of the frame can be metallic.

The present disclosure also relates to an aircraft seat primary structure, comprising a frame as described and a covering shell wrapping said frame, and an airplane-type aircraft seat, comprising such a primary structure.

The present disclosure also relates to a method for manufacturing a frame as described, for an aircraft seat primary structure, comprising:

a step of defining the longitudinal and transverse parts according to a shape of the primary structure;

a step of cutting the defined parts in planar plates; and a step of assembling the cut parts by their joints to replicate the shape of the primary structure.

Advantageously, the method further comprises a step of rigidly fastening the obtained assembly by welding, gluing, clipping or any other conventional technique.

The fundamental concepts of the disclosure that have just been disclosed hereinabove in their most elementary form, other details and features will appear more clearly upon reading the following description and with reference to the appended drawings, giving as a non-limiting example an embodiment of a frame and of an associated manufacturing method in accordance with the principles of the disclosure.

BRIEF DESCRIPTION OF THE FIGURES

The FIGURES are given for merely illustrative purposes for the understanding of the disclosure and do not limit the scope thereof. The different elements are not necessarily represented at the same scale. In all FIGURES, identical or equivalent elements bear the same reference numeral.

It is Thus Illustrated in.

DETAILED DESCRIPTION

It should be noted that some well-known assemblies and methods are described herein to avoid any insufficiency or ambiguity in the understanding of the present disclosure.

In the embodiment described hereinafter, reference is made to a metal frame formed by cut and assembled planar parts, intended mainly for a passenger seat separation shell in an aircraft cabin. This non-limiting example is given for a better understanding of the disclosure and does not exclude the manufacture of a similar frame in any material and for other aircraft on-board equipment or supply.

In the rest of the description, the term "frame" refers to a structural set formed by an assembly of non-adjoining elements mostly elongated.

Figure 1:
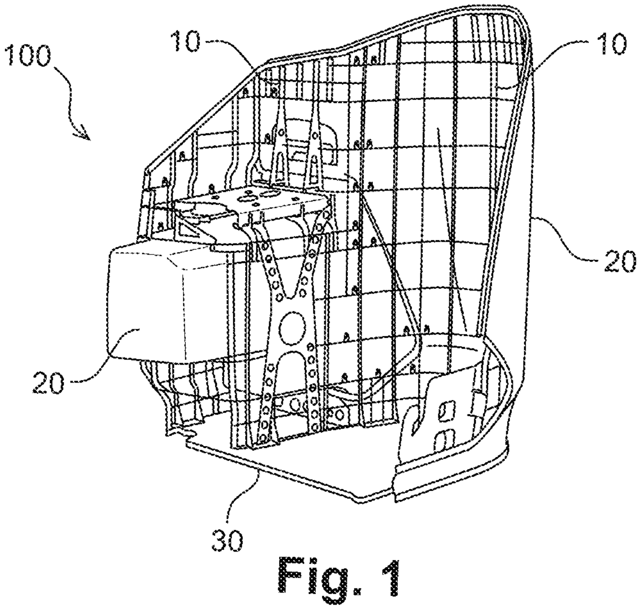
FIG. 1: a perspective view of an aircraft seat primary structure comprising a frame according to an embodiment of the disclosure.

FIG. 1 partially represents an aircraft passenger seat primary structure 100 mainly comprising a metal frame 10 according to the disclosure, a covering shell 20 fastened to said frame as well as any other structural element necessary for making the seat such as a fastening base 30. For example, the cover shell 20 may be thermoformed or molded.

According to the illustrated example, the primary structure 100 is that of a passenger seat in the "front" cabin, in other words of higher class such as business class, and therefore has volumes suited for more comfort and for a separation of the installed passenger from the rest of the cabin for more privacy. Of course, the disclosure can be applied to any other aircraft seat or equipment having more or less complex three-dimensional shapes.

The brief and partial presentation made hereinabove of the primary structure of the seat allows just defining the context of application of the disclosure, the main object of which is the frame.

Figure 2:
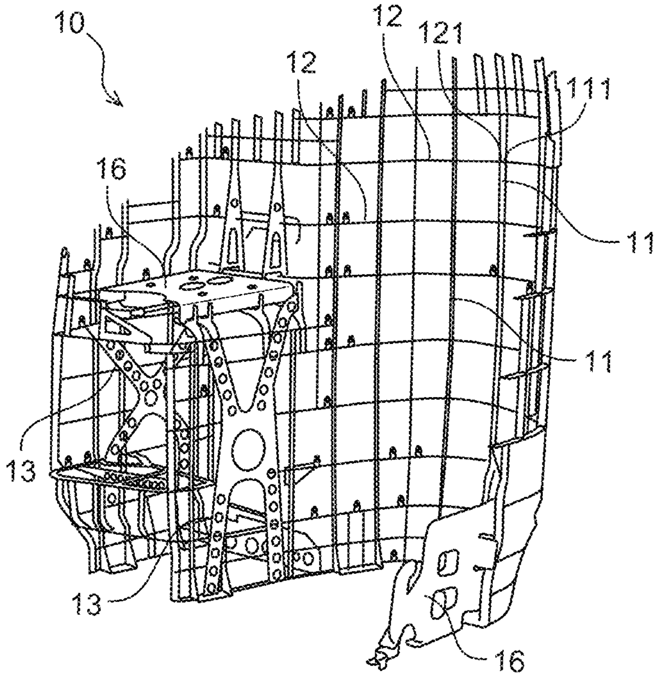
FIG. 2: a perspective view of the isolated frame.
Figure 3:
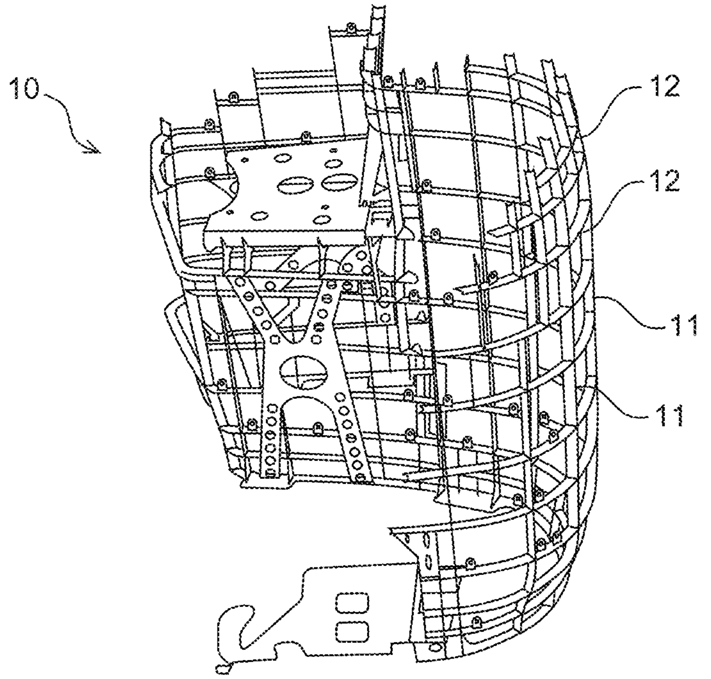
FIG. 3: another perspective view of the frame.

FIGS. 2 and 3 represent the frame 10 isolated. According to this non-limiting example, the frame 10 is shaped like a generally concave shell and includes longitudinal 11 and transverse 12 planar parts assembled together which have been cut beforehand. The planar parts 11 and 12 are shaped so as to be assembled together at specific locations so as to form the frame 10 according to a defined three-dimensional shape.

Thus, the frame 10 replicates the general shape of the covering shell 20 thanks to the shapes and dimensions of the assembled planar parts 11 and 12. These geometric shapes and dimensions are determined beforehand on the basis of a digital model of the seat, for example, as will be explained later on.

Figure 4:
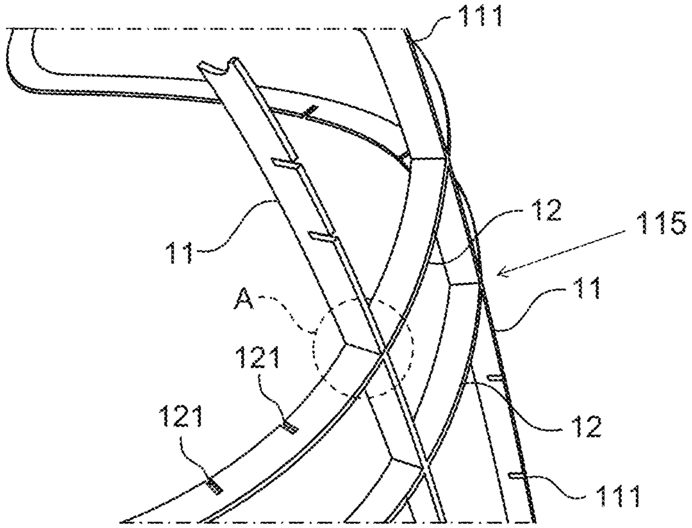
FIG. 4: a partial perspective view of planar longitudinal and transverse parts assembled according to the disclosure.

Referring to FIG. 4, each longitudinal part 11 includes a plurality of joints 111 along one edge of said part, into which transverse parts 12 are inserted. Likewise, each transverse part 12 is provided with a plurality of joints 121 along an edge of said part so as to receive longitudinal parts 11.

Indeed, the longitudinal 11 and transverse 12 parts are assembled by their joints 111 and 121 like a T-shaped half-timber assembly 115, better known in old naval constructions of wooden vessels.

The joints 111 and 121 correspond to straight indentations, i.e. having a U-shape.

Figure 5:
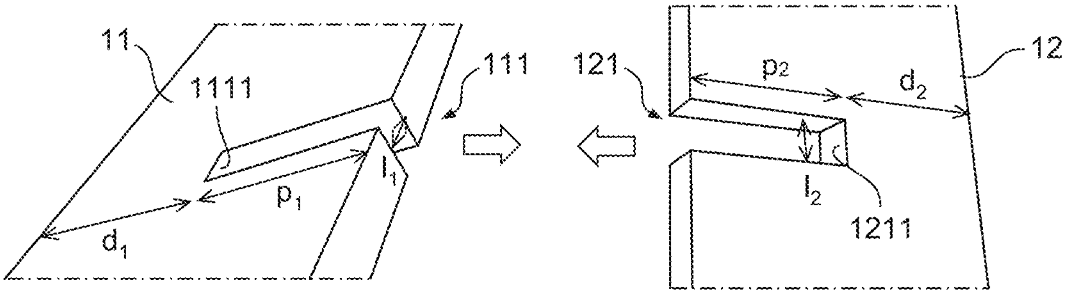
FIG. 5: a partial view of two planar parts before assembly thereof by their joints according to the disclosure.

FIG. 5 partially schematizes a longitudinal part 11 and a transverse part 12 at their joints 111 and 121 before assembly thereof. The joint 111 has a depth $p_1$ delimited by a bottom 1111 beyond which the part 11 has a residual width $d_1$. Similarly, the joint 121, associated with the joint 111, has a depth $p_2$ delimited by a bottom 1211 beyond which the part 12 has a residual width $d_2$. To obtain a conventional assembly in which each part straddles the other part without protruding therefrom, the depth $p_1$ and the depth $p_2$ are smaller than or equal to the residual width $d_2$ and the residual width $d_1$, respectively. Preferably, when the parts 11 and 12 have the same width at their joints, the depth $p_1$ and the depth $p_2$ are respectively equal to the residual width $d_2$ and to the residual width $d_1$, which allows obtaining perfect straddling as shown in the detail A of FIG. 4. In this case, the thickness of the frame 10 formed locally to the width of the assembled parts 11 and 12. More preferably, the depth of a joint is substantially equal to the residual width on the same part ($p_1=d_1$ and $p_2=d_2$), in other words, each joint extends over half the local width of the part including it, thus offering better mechanical strength. In the latter case, the joints are said to be half-by-half, i.e. they define two equal portions in the volume of the parts, a hollowed portion (the joint itself) and a solid portion.

Furthermore, the parts 11 and 12 may have different thicknesses, in which case the joints 111 and 121 must have suitable widths $1_1$ and $1_2$. In the example of FIG. 5, the width $\mathbf{1}_1$ of the joint 111 must be substantially equal to the thickness of the part 12 at the area intended to be straddled by said joint.

Conversely, the joint 121 must have a width 12 substantially equal to the local thickness of the part 11. This dimensional correspondence enables interlocking of the parts 11 and 12 with a minimum functional clearance, or mounting by interference when the widths of the joints are substantially smaller than the thicknesses of the parts.

The joints 111 and 121 can be oriented differently along the parts 11 and 12.

Figure 6:
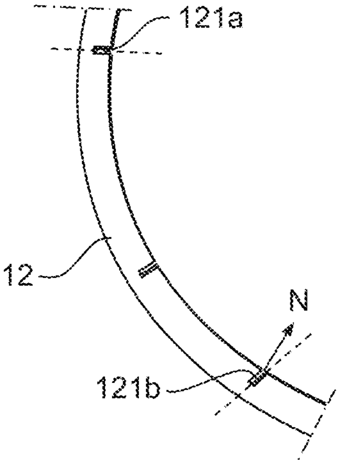
FIG. 6: a partial view of a flat transverse part showing joints of different orientations.

FIG. 6 illustrates some possible orientations of the joints 121 along a portion of a transverse part 12. For example, the joint 121*a* is normal to the part 12 whereas the joint 121*b* is slightly inclined with respect to the normal N of the part 12. The relative orientations of the joints 121 of the transverse parts 12 determine the orientations of the longitudinal parts 11 which will be mounted therein.

Preferably, only the joints 121 of the transverse parts 12 can be inclined with respect to the local normals. In turn, the joints 111 of the longitudinal parts 11 are normal so that said longitudinal parts, or stringers, are necessarily perpendicular to the transverse parts, or bulkheads, after assembly. More specifically, the mean planes of the stringers 11 remain perpendicular to the mean planes of the bulkheads 12, regardless of their orientations, these being determined according to constraints related to the final shape of the frame 10.

In view of the foregoing, it should be easily understood that the present disclosure provides a considerable advantage by allowing obtaining a very wide variety of shapes simply thanks to planar parts 11 and 12 which are assembled by joints 111 and 121 and whose shapes and dimensions have been determined beforehand.

Figure 7:
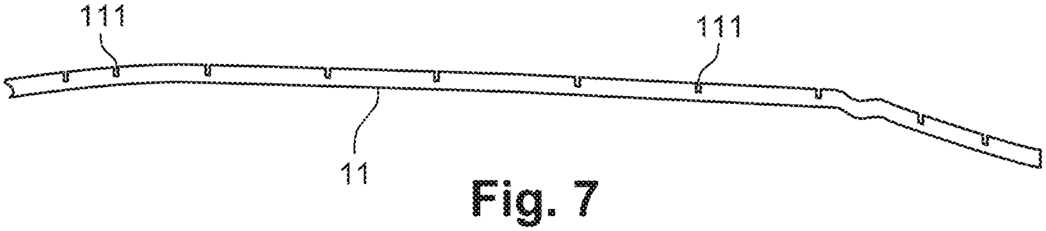
FIG. 7: an example of a longitudinal planar part.
Figure 8:
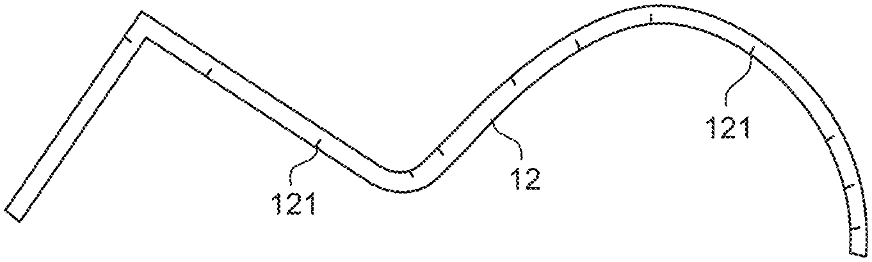
FIG. 8: an example of a transverse planar part.

Examples of a longitudinal part 11 and a transverse part 12 of the frame are given in FIGS. 7 and 8.

Figure 9:
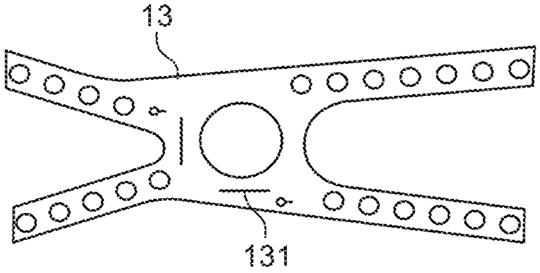
FIG. 9: an example of an auxiliary planar part.

Furthermore, the frame 10 may include any other planar auxiliary part 13 to address some functional and/or structural problems. FIG. 9 represents an example of an auxiliary part 13 including a groove 131 by which said part is fastened to the rest of the frame, by means of a tenon-mortise assembly for example, the tenon being for example formed on a longitudinal 11 or transverse 12 part.

Figure 10:
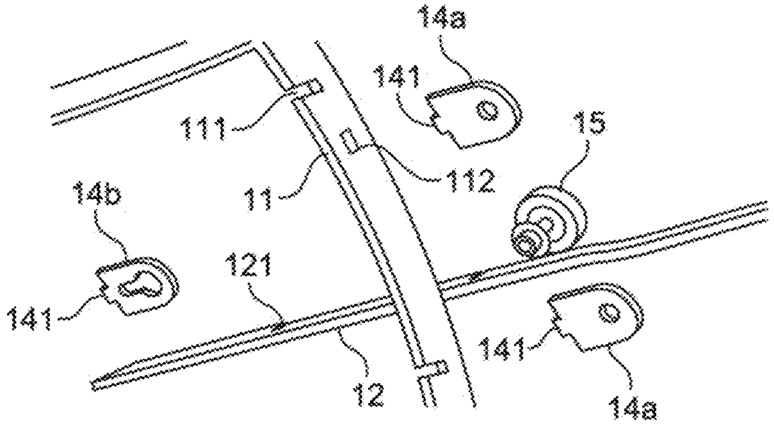
FIG. 10: an exploded partial view of a portion of the frame showing complementary fastening and hooking parts according to the disclosure.

The frame 10 may also include planar hooking and fastening parts 14*a* and 14*b* as well as connecting means 15 as represented in FIG. 10. The hooking and fastening parts 14*a* and 14*b* are fastened to the longitudinal 11 and/or transverse 12 parts by means of tenons 141 which fit in mortises 112 provided to this end on said longitudinal and/or transverse parts.

Incidentally, the frame 10 may include almost planar parts 16, indicated in FIG. 2, having some reliefs obtained by a sheet forming or bending process.

Thus, the frame according to the concepts of the present disclosure offers great modularity and allows obtaining complex 3D shapes starting from elementary 2D parts defined and prepared beforehand.

The Frame 10 can be Manufactured by a Method Comprising:

- a step of defining the longitudinal 11 and transverse 12 parts according to a shape of the primary structure;
- a step of cutting the parts defined in planar plates.
- a step of assembling the cut parts by their joints to replicate the shape of the primary structure; and
- a step of rigidly fastening the obtained assembly.

The step of defining the longitudinal 11 and transverse 12 parts forming the frame consists in determining the shapes and the dimensions of said parts as well as their number and distribution in the frame. To this end, a model of the primary structure 100 for which the frame is intended can be used. Thus, it is for example possible to define the parts 11 and 12 from longitudinal and transverse sections made in the CAD (Computer Aided Design) model of the primary structure.

The other planar parts of the frame 10, namely the auxiliary parts 13 of any shape and the hooking and fastening parts 14*a* and 14*b*, can be defined in the same manner.

The step of cutting the parts, including the complementary parts, can be carried out by any cutting technique used in mechanical manufacturing such as laser cutting or water jet cutting depending on the used material. It should be noted that it is preferable to proceed by laser cutting in view of the performances, in terms of efficiency and accuracy, obtained by this technique, and this on different materials (metal, plastic, etc.).

The step of assembling the parts of the frame 10 takes place according to the operations of joining by the joints explained hereinabove.

Finally, the obtained assembly is rigidly fastened by welding, gluing, clipping or by any other conventional means of mechanical manufacturing.

It should be noted that making a frame from simple independent parts greatly facilitates the maintenance and the repair of the aircraft seat, and considerably limits its cost. Indeed, all it needs is to replace some faulty longitudinal or transverse parts, unlike a one-piece composite structure in which damages could be problematic and require the replacement of the entire structure.

It clearly arises from the present description that the different planar parts of the frame can be made differently without departing from the scope of the disclosure, defined in the claims.

What is claimed is:

1. A method for manufacturing a frame for an aircraft seat separation shell, the aircraft seat separation shell comprising the frame and a covering shell wrapping and fastened to the frame, the frame comprising longitudinal parts spaced apart from each other and transverse parts spaced apart from each other, the longitudinal parts and transverse parts being assembled together said longitudinal parts and transverse parts having varied shapes and dimensions so as to form a three-dimensional shape of the separation shell, wherein the longitudinal parts and transverse parts are planar, and wherein each of the longitudinal parts and transverse parts includes at least one joint, the method comprising:

- a step of defining the longitudinal parts and transverse parts according to a shape of the aircraft seat separation shell said defining step comprising determining shapes and dimensions of said longitudinal parts and transverse parts, as well as a number and distribution thereof in the frame;
- a step of cutting the defined longitudinal parts and transverse parts in planar plates; and
- a step of assembling the cut longitudinal parts and transverse parts by their joints to replicate the shape of the aircraft seat separation shell;
- wherein the longitudinal parts and transverse parts are defined from longitudinal and transverse sections made in a CAD model of the aircraft seat separation shell.

2. The method according to claim 1, further comprising a step of rigidly fastening the obtained assembly by one or more of welding, gluing, and clipping.

3. An aircraft seat separation shell-comprising a frame and a covering shell wrapping and fastened to said frame, wherein the frame is obtained by the method according to claim 1.

4. The aircraft seat separation shell according to claim 3, wherein each longitudinal part is provided with a plurality of joints distributed along an edge of said part, each of said joints cooperating with a joint of a transverse part, and wherein each transverse part is provided with a plurality of joints distributed along an edge of said part, each of said joints cooperating with a joint of a longitudinal part.

5. The aircraft seat separation shell according to claim 3, wherein the mean planes of the transverse parts are substantially parallel and the mean planes of the longitudinal parts are substantially perpendicular to the mean planes of the said transverse parts.

6. The aircraft seat separation shell according to claim 3, wherein each joint comprises a notch having a depth substantially equal to half a local width of the part that includes said joint.

7. The aircraft seat separation shell according to claim 3, wherein each assembly between a longitudinal part and a transverse part is T-shaped half-timber.

8. The aircraft seat separation shell according to claim 3, wherein the longitudinal and transverse parts are plate elements.

9. The aircraft seat separation shell according to claim 3, further including auxiliary planar parts of any shapes as well as hooking and fastening planar parts.

10. The aircraft seat separation shell according to claim 9, wherein the auxiliary parts and the hooking and fastening parts are fastened to the rest of the frame by tenons and mortises.

11. The aircraft seat separation shell according to claim 3, wherein the longitudinal and transverse parts are metallic.

* * * * *